(12) United States Patent
Sun et al.

(10) Patent No.: US 10,542,280 B2
(45) Date of Patent: Jan. 21, 2020

(54) ENCODING OPTIMIZATION WITH ILLUMINATION COMPENSATION AND INTEGER MOTION VECTOR RESTRICTION

(71) Applicant: QUALCOMM Incorporated, San Diego, CA (US)

(72) Inventors: Yu-Chen Sun, San Diego, CA (US); Wei-Jung Chien, San Diego, CA (US); Li Zhang, San Diego, CA (US); Yi-Wen Chen, San Diego, CA (US); Nan Hu, San Diego, CA (US); Marta Karczewicz, San Diego, CA (US)

(73) Assignee: QUALCOMM Incorpated, San Diego, CA (US)

( * ) Notice: Subject to any disclaimer, the term of this patent is extended or adjusted under 35 U.S.C. 154(b) by 0 days.

(21) Appl. No.: 15/865,054

(22) Filed: Jan. 8, 2018

(65) Prior Publication Data

US 2018/0199055 A1    Jul. 12, 2018

Related U.S. Application Data

(60) Provisional application No. 62/444,321, filed on Jan. 9, 2017.

(51) Int. Cl.
*H04N 19/00* (2014.01)
*H04N 19/52* (2014.01)
(Continued)

(52) U.S. Cl.
CPC ............. *H04N 19/52* (2014.11); *H04N 19/44* (2014.11); *H04N 19/91* (2014.11)

(58) Field of Classification Search
CPC .. H04N 19/139; H04N 19/117; H04N 19/194; H04N 19/53; H04N 19/91;
(Continued)

(56) References Cited

U.S. PATENT DOCUMENTS

2011/0109794 A1* 5/2011 Wiercienski .......... G06T 3/4053
348/441
2017/0142438 A1* 5/2017 Hepper ................ H04N 19/117
(Continued)

OTHER PUBLICATIONS

Chen et al. "Algorithm Description of Joint Exploration Test Model 2". JVET-B1001. Feb. 2016. (Year: 2016).*
(Continued)

*Primary Examiner* — Zhihan Zhou
(74) *Attorney, Agent, or Firm* — Shumaker & Sieffert, P.A.

(57) ABSTRACT

A video encoder is configured to determine whether to enable or disable an integer motion vector precision restriction and whether to enable or disable an illumination compensation (IC) tool by: for a large search range in a reference picture, performing first motion estimation tests, wherein performing the first motion estimation tests comprises performing motion estimation tests only with the IC tool disabled and the integer motion vector precision restriction disabled and with the IC tool enabled and the integer motion vector precision restriction disabled; based on the first motion estimation tests, determining a small search range, wherein the small search range is smaller than the large search range; for the small search range, performing second motion estimation tests; and based on the second motion estimation tests, determining whether to enable or disable the integer motion vector precision restriction and whether to enable or disable the IC tool.

10 Claims, 13 Drawing Sheets

(51) Int. Cl.
*H04N 19/44* (2014.01)
*H04N 19/91* (2014.01)

(58) Field of Classification Search
CPC ...... H04N 19/523; H04N 19/57; H04N 19/52; H04N 19/44; H04N 19/176
See application file for complete search history.

(56) References Cited

U.S. PATENT DOCUMENTS

| | | |
|---|---|---|
| 2017/0208336 A1 | 7/2017 | Li et al. |
| 2017/0272782 A1 | 9/2017 | Li et al. |
| 2018/0077417 A1* | 3/2018 | Huang ................. H04N 19/105 |

OTHER PUBLICATIONS

ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.
Chen., et al., "Algorithm description of Joint Exploration Test Model 2," Joint Video Exploration Team (JVET) of ITU-T SG 16 WP 3 and ISO/IED JTC 1/SC 29/WG 11, 2nd Meeting: San Diego, USA, Feb. 20-26, 2016, JVET-B1001, Mar. 25, 2016, 32 pages.
Chen J., et al., "Algorithm Description of Joint Exploration Test Model 3," Document: JVET-C1001_v3, Joint Video Exploration Team (JVET) of ITU-T SG 16 WP 3 and ISO/IEC JTC 1/SC 29/WG 11, 3rd Meeting: Geneva, CH, May 26-Jun. 1, 2016, 37 Pages.
Sullivan G.J., et al., "Overview of the High Efficiency Video Coding (HEVC) Standard," IEEE Transactions on Circuits and Systems for Video Technology, IEEE Service Center, Piscataway, NJ, US, vol. 22, No. 12, Dec. 1, 2012, XP011487803, pp. 1649-1668.
Bross B., et al., "High Efficiency Video Coding (HEVC) Text Specification Draft 10 (for FDIS & Last Call)," 12th Meeting: Geneva, CH, Jan. 14-23, 2013, (Joint Collaborative Team on Video Coding of ISO/IEC JTC 1/SC 29/WG 11 and ITU-T SG 16 WP 3); JCTVC-L1003_v34, Mar. 19, 2013, 310 pages.
Wang et al., "High Efficiency Video Coding (HEVC) Defect Report," Joint Collaborative Team on Video Coding (JCT-VC) of ITU-T SG 16 WP 3 and ISO/IEC JTC 1/SC 29/WG 11, JCTVC-N1003-v1, 14th Meeting: Vienna, AT, Jul. 25-Aug. 2, 2013, 311 pp.
Chen et al., "Alogorithm Description of Joint Exploration Test Model 7 {JEM 7)," Joint Video Exploration Team (JVET) of ITU-T SG 16 WP 3 and ISO/IEC JTC 1/SC 29/WG11, 7th Meeting: Torino, IT< Jul. 13-21, 2017, JVET-G1001-v1, 50 pp.
Chen J., et al., "Algorithm description of Joint Exploration Test Model 3 (JEM3)," 3, JVET Meeting; May 26, 2016-Jun. 1, 2016; Geneva; (The Joint Video Exploration Team of ISO/IEC JTC1/SC29/WG11 and ITU-T SG.16); URL: http://phenix.int-evry.fr/jvet/, No. JVET-C1001_v1, Jul. 2, 2016 (Jul. 2, 2016), XP030150223, 38 Pages.
Chen J., et al., "Further Improvements to HMKTA-1.1," 52. VCEG Meeting, Jun. 19, 2015-Jun. 26, 2015, Warsaw, (Video Coding Experts Group of ITU-T SG.16), No. VCEG-AZ07_V3, Jun. 25, 2015 (Jun. 25, 2015), XP030003886, 8 pages.
International Search Report and Written Opinion—PCT/US2018/012990—ISA/EPO—dated May 28, 2018.
Laroche G., et al., "Non-RCE1: On MV Resolution and Motion Vector Predictor Number," 17. JCT-VC Meeting; Mar. 27, 2014-Apr. 4, 2014; Valencia; (Joint Collaborative Team on Video Coding of ISO/IEC JTC1/SC29/WG11 and ITU-T SG.16); URL: http://wftp3.itu.int/av-arch/jctvc-site/, No. JCTVC-Q0067-v3, Mar. 28, 2014 (Mar. 28, 2014), pp. 1-6, XP030115963.
Li X., et al., "RCE1.2: Adaptive MV Precision," 17. JCT-VC Meeting; Mar. 27, 2014-Apr. 4, 2014; Valencia; Joint Collaborative Team on Video Coding of ISO/IEC JTC1/SC29/WG11 and ITU-T SG.16; URL: http://wftp3.itu.int/av-arch/jctvc-site/, No. JCTVC-Q0049, Mar. 17, 2014 (Mar. 17, 2014), XP030115940, 4 Pages.
Liu H., et al., "Local Illumination Compensation," 52. VCEG Meeting; Jun. 19, 2015-Jun. 26, 2015; Warsaw; (Video Coding Experts Group of ITU-T SG. 16), No. VCEG-AZ06_r1, Jun. 25, 2015 (Jun. 25, 2015), 4 Pages, XP030003884.

* cited by examiner

ENCODING OPTIMIZATION WITH ILLUMINATION COMPENSATION AND INTEGER MOTION VECTOR RESTRICTION

This Application claims the benefit of U.S. Provisional Patent Application 62/444,321 filed 9 Jan. 2017, the entire content of which is hereby incorporated by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), ITU-T H.265, High Efficiency Video Coding (HEVC), and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes techniques related to techniques for encoding video data using and illumination compensation (IC) tool and an integer motion vector precision restriction. Specifically, this disclosure describes techniques for determining whether to enable or disable the IC tool and whether to enable or disable the integer motion vector precision restriction. The techniques of this disclosure may reduce the amount of motion estimation testing performed by a video encoder without any significant reduction in compression quality, thus enabling the video decoder to more quickly encode video data.

According to one example, a method of encoding video data includes partitioning the video data into a plurality of blocks; for a block of the plurality of blocks, determining whether to enable or disable an integer motion vector precision restriction and whether to enable or disable an illumination compensation (IC) tool, wherein determining whether to enable or disable the integer motion vector precision restriction and whether to enable or disable the IC tool comprises: for a large search range in a reference picture, performing first motion estimation tests, wherein performing the first motion estimation tests comprises performing motion estimation tests only with the IC tool disabled and the integer motion vector precision restriction disabled and with the IC tool enabled and the integer motion vector precision restriction disabled; based on the first motion estimation tests, determining a small search range, wherein the small search range is smaller than the large search range; for the small search range, performing second motion estimation tests; and based on the second motion estimation tests, determining whether to enable or disable the integer motion vector precision restriction and whether to enable or disable the IC tool; and outputting a bitstream of encoded video data comprising an indication of whether the IC tool is enabled or disabled and an indication of whether the integer motion vector precision restriction is enabled or disabled.

According to another example, a device for encoding video data includes a memory configured to store video data; and one or more processors configured to partition the video data into a plurality of blocks; for a block of the plurality of blocks, determine whether to enable or disable an integer motion vector precision restriction and whether to enable or disable an illumination compensation (IC) tool, wherein to determine whether to enable or disable the integer motion vector precision restriction and whether to enable or disable the IC tool, the one or more processors are configured to: for a large search range in a reference picture, perform first motion estimation tests, wherein to perform the first motion estimation tests the one or more processors are configured to perform motion estimation tests only with the IC tool disabled and the integer motion vector precision restriction disabled and with the IC tool enabled and the integer motion vector precision restriction disabled; based on the first motion estimation tests, determine a small search range, wherein the small search range is smaller than the large search range; for the small search range, perform second motion estimation tests; and based on the second motion estimation tests, determine whether to enable or disable the integer motion vector precision restriction and whether to enable or disable the IC tool; and output a bitstream of encoded video data comprising an indication of whether the IC tool is enabled or disabled and an indication of whether the integer motion vector precision restriction is enabled or disabled.

According to another example, a computer readable medium stores instructions that when executed by one or more processors cause the one or more processors to: partition the video data into a plurality of blocks; for a block of the plurality of blocks, determine whether to enable or disable an integer motion vector precision restriction and whether to enable or disable an illumination compensation (IC) tool, wherein to determine whether to enable or disable the integer motion vector precision restriction and whether to enable or disable the IC tool, the instructions cause the one or more processors to: for a large search range in a reference picture, perform first motion estimation tests, wherein to perform the first motion estimation tests the one or more processors are configured to perform motion estimation tests only with the IC tool disabled and the integer motion vector precision restriction disabled and with the IC tool enabled and the integer motion vector precision restriction disabled; based on the first motion estimation tests, determine a small search range, wherein the small search range is smaller than the large search range; for the small search range, perform second motion estimation tests; and based on the second motion estimation tests, determine whether to enable or disable the integer motion vector precision restriction and whether to enable or disable the IC tool; and output a bitstream of encoded video data comprising an indication of whether the IC tool is enabled or disabled and an indication of whether the integer motion vector precision restriction is enabled or disabled.

According to another example, an apparatus for encoding video data includes means for partitioning the video data into a plurality of blocks; means for determining whether to enable or disable an integer motion vector precision restriction and whether to enable or disable an illumination compensation (IC) tool for a block of the plurality of blocks, wherein the means for determining whether to enable or disable the integer motion vector precision restriction and whether to enable or disable the IC tool comprises: means for performing first motion estimation tests for a large search range in a reference picture, wherein the means for performing the first motion estimation tests comprises means for performing motion estimation tests only with the IC tool disabled and the integer motion vector precision restriction disabled and with the IC tool enabled and the integer motion vector precision restriction disabled; means for determining a small search range based on the first motion estimation tests, wherein the small search range is smaller than the large search range; means for performing second motion estimation tests for the small search range; and means for determining whether to enable or disable the integer motion vector precision restriction and whether to enable or disable the IC tool based on the second motion estimation tests; and means for outputting a bitstream of encoded video data comprising an indication of whether the IC tool is enabled or disabled and an indication of whether the integer motion vector precision restriction is enabled or disabled.

The details of one or more aspects of the disclosure are set forth in the accompanying drawings and the description below. Other features, objects, and advantages of the techniques described in this disclosure will be apparent from the description, drawings, and claims.

DETAILED DESCRIPTION

This disclosure describes techniques related to motion vector prediction and coding by parent motion. The techniques of this disclosure may be used in conjunction with any of the existing video codecs, such as HEVC (High Efficiency Video Coding), or may be an efficient coding tool for use in a future video coding standard, such as the H.266 standard and extensions thereof.

This disclosure also describes techniques for encoding video data using and illumination compensation (IC) tool and an integer motion vector precision restriction. Specifically, this disclosure describes techniques for determining whether to enable or disable the IC tool and whether to enable or disable the integer motion vector precision restriction. The techniques of this disclosure may reduce the amount of motion estimation testing performed by a video encoder without any significant reduction in compression quality, thus enabling the video decoder to more quickly encode video data.

Figure 1:
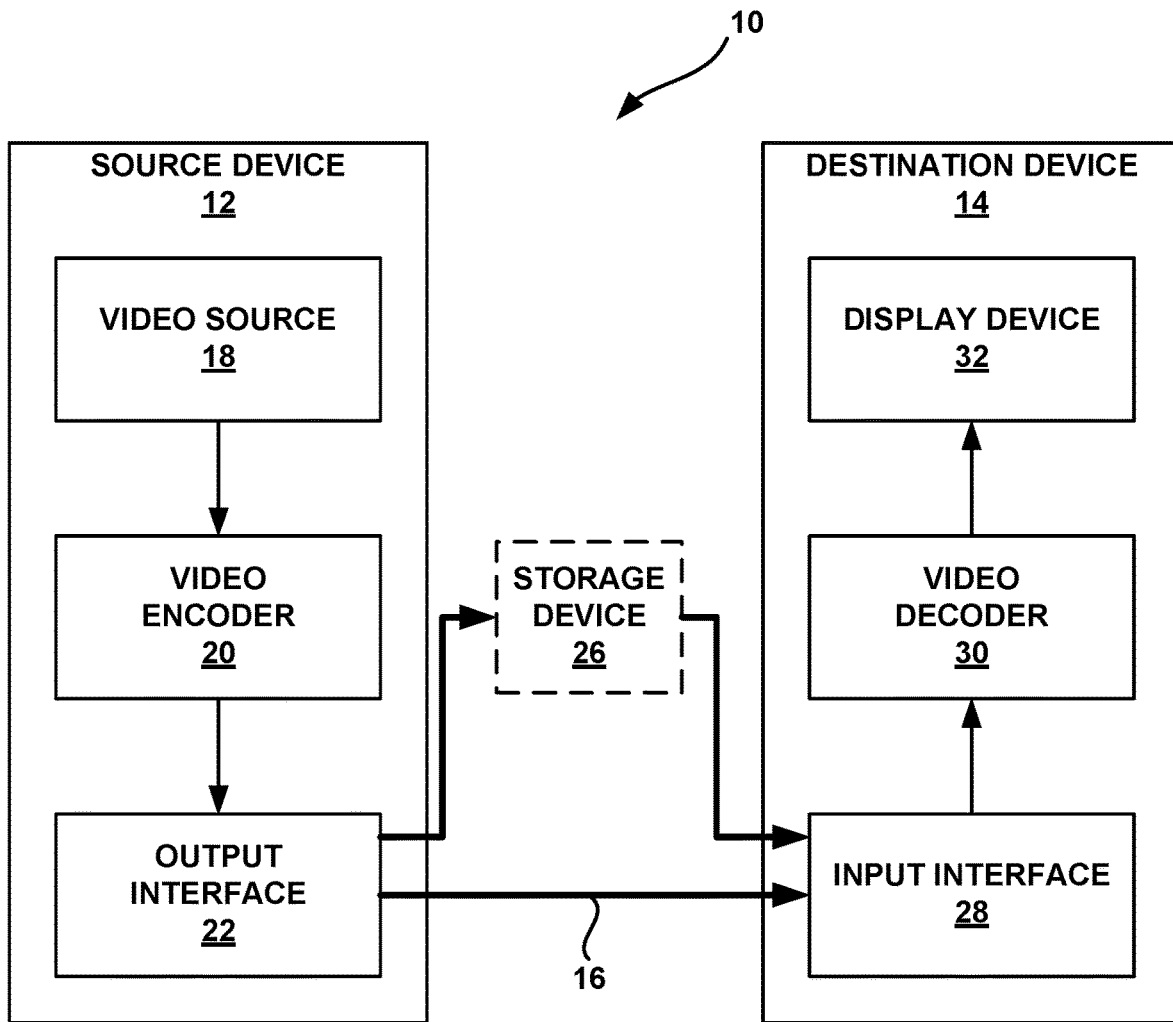
FIG. 1 is a block diagram illustrating an example video encoding and decoding system that may utilize the techniques described in this disclosure.

FIG. 1 is a block diagram illustrating an example video encoding and decoding system 10 that may utilize the techniques described in this disclosure. As shown in FIG. 1, system 10 includes a source device 12 that generates encoded video data to be decoded at a later time by a destination device 14. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via a link 16. Link 16 may comprise any type of medium or device capable of moving the encoded video data from source device 12 to destination device 14. In one example, link 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In another example, encoded data may be output from output interface 22 to a storage device 26. Similarly, encoded data may be accessed from storage device 26 by input interface. Storage device 26 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 26 may correspond to a file server or another intermediate storage device that may hold the encoded video generated by source device 12. Destination device 14 may access stored video data from storage device 26 via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 26 may be a streaming transmission, a download transmission, or a combination of both.

The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes a video source 18, video encoder 20 and an output interface 22. In some cases, output interface 22 may include a modulator/demodulator (modem) and/or a transmitter. In source device 12, video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called smartphones, camera phones or video phones. However, the techniques described in this disclosure may be applicable to video coding in general, and may be applied to wireless and/or wired applications.

The captured, pre-captured, or computer-generated video may be encoded by video encoder 20. The encoded video data may be transmitted directly to destination device 14 via output interface 22 of source device 12. The encoded video data may also (or alternatively) be stored onto storage device 26 for later access by destination device 14 or other devices, for decoding and/or playback.

Destination device 14 includes an input interface 28, a video decoder 30, and a display device 32. In some cases, input interface 28 may include a receiver and/or a modem. Input interface 28 of destination device 14 receives the encoded video data over link 16. The encoded video data communicated over link 16, or provided on storage device 26, may include a variety of syntax elements generated by video encoder 20 for use by a video decoder, such as video decoder 30, in decoding the video data. Such syntax elements may be included with the encoded video data transmitted on a communication medium, stored on a storage medium, or stored a file server.

Display device 32 may be integrated with, or external to, destination device 14. In some examples, destination device 14 may include an integrated display device and also be configured to interface with an external display device. In other examples, destination device 14 may be a display device. In general, display device 32 displays the decoded video data to a user, and may comprise any of a variety of display devices such as a liquid crystal display (LCD), a plasma display, an organic light emitting diode (OLED) display, or another type of display device.

Video encoder 20 and video decoder 30 may operate according to a video compression standard, such as the recently finalized High Efficiency Video Coding (HEVC) standard and may conform to the HEVC Test Model (HM). Video encoder 20 and video decoder 30 may additionally operate according to an HEVC extension, such as the range extension, the multiview extension (MV-HEVC), or the scalable extension (SHVC) which have been developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG). The HEVC standard is published as ITU-T H.265, Series H: Audiovisual and Multimedia Systems, Infrastructure of audiovisual services—Coding of moving video, High efficiency video coding, Telecommunication Standardization Sector of International Telecommunication Union (ITU), April 2015.

Video encoder 20 and video decoder 30 may also operate according to other proprietary or industry standards, such as the ITU-T H.264 standard, alternatively referred to as ISO/IEC MPEG-4, Part 10, Advanced Video Coding (AVC), or extensions of such standards, such as the Scalable Video Coding (SVC) and Multi-view Video Coding (MVC) extensions. The techniques of this disclosure, however, are not limited to any particular coding standard, and may be applicable to future standards. Other examples of video compression standards include ITU-T H.261, ISO/IEC MPEG-1 Visual, ITU-T H.262 or ISO/IEC MPEG-2 Visual, ITU-T H.263, and ISO/IEC MPEG-4 Visual.

ITU-T VCEG (Q6/16) and ISO/IEC MPEG (JTC 1/SC 29/WG 11) are now studying the potential need for standardization of future video coding technology with a compression capability that significantly exceeds that of the current HEVC standard (including its current extensions and near-term extensions for screen content coding and high-dynamic-range coding). The groups are working together on this exploration activity in a joint collaboration effort known as the Joint Video Exploration Team (JVET) to evaluate compression technology designs proposed by their experts in this area. The JVET first met during 19-21 Oct. 2015. One version of reference software, i.e., Joint Exploration Model 2 (JEM 2) can be downloaded from: https://jvet.hhi.fraunhofer.de/svn/svn_HMJEMSoftware/tags/HM-16.6-JEM-2.0/. An algorithm for JEM2 is described in J. Chen, E. Alshina, G. J. Sullivan, J.-R. Ohm, J. Boyce, "Algorithm description of Joint Exploration Test Model 2", JVET-B1001, San Diego, March 2016, which description is incorporated herein by reference. Another version of the reference software, i.e., Joint Exploration Model 3 (JEM 3) can be downloaded from: https://jvet.hhi.fraunhofer.de/svn/svn_HMJEMSoftware/tags/HM-16.6-JEM-3.0/. The Algorithm description for JEM3 may also be referred to as JVET-C1001 and is incorporated herein by reference.

Techniques of this disclosure may utilize HEVC terminology for ease of explanation. It should not be assumed, however, that the techniques of this disclosure are limited to HEVC, and in fact, it is explicitly contemplated that the techniques of this disclosure may be implemented in successor standards to HEVC and its extensions.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

In HEVC and other video coding specifications, a video sequence typically includes a series of pictures. Pictures may also be referred to as "frames." In one example approach, a picture may include three sample arrays, denoted $S_L$, $S_{Cb}$, and $S_{Cr}$. In such an example approach, $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

To generate an encoded representation of a picture, video encoder 20 may generate a set of coding tree units (CTUs). Each of the CTUs may comprise a coding tree block of luma samples, two corresponding coding tree blocks of chroma samples, and syntax structures used to code the samples of the coding tree blocks. In monochrome pictures or pictures having three separate color planes, a CTU may comprise a single coding tree block and syntax structures used to code the samples of the coding tree block. A coding tree block may be an N×N block of samples. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more coding units (CUs). A slice may include an integer number of CTUs ordered consecutively in a raster scan order.

To generate a coded CTU, video encoder 20 may recursively perform quad-tree partitioning on the coding tree blocks of a CTU to divide the coding tree blocks into coding blocks, hence the name "coding tree units." A coding block may be an N×N block of samples. A CU may comprise a coding block of luma samples and two corresponding coding blocks of chroma samples of a picture that has a luma sample array, a Cb sample array, and a Cr sample array, and syntax structures used to code the samples of the coding blocks. In monochrome pictures or pictures having three separate color planes, a CU may comprise a single coding block and syntax structures used to code the samples of the coding block.

Video encoder 20 may partition a coding block of a CU into one or more prediction blocks. A prediction block is a rectangular (i.e., square or non-square) block of samples on which the same prediction is applied. A prediction unit (PU) of a CU may comprise a prediction block of luma samples, two corresponding prediction blocks of chroma samples, and syntax structures used to predict the prediction blocks. In monochrome pictures or pictures having three separate color planes, a PU may comprise a single prediction block and syntax structures used to predict the prediction block. Video encoder 20 may generate predictive luma, Cb, and Cr blocks for luma, Cb, and Cr prediction blocks of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the picture associated with the PU. If video encoder 20 uses inter prediction to generate the predictive blocks of a PU, video encoder 20 may generate the predictive blocks of the PU based on decoded samples of one or more pictures other than the picture associated with the PU.

After video encoder 20 generates predictive luma, Cb, and Cr blocks for one or more PUs of a CU, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may use quad-tree partitioning to decompose the luma, Cb, and Cr residual blocks of a CU into one or more luma, Cb, and Cr transform blocks. A transform block is a rectangular (e.g., square or non-square) block of samples on which the same transform is applied. A transform unit (TU) of a CU may comprise a transform block of luma samples, two corresponding transform blocks of chroma samples, and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients.

Video encoder 20 may output a bitstream that includes a sequence of bits that forms a representation of coded pictures and associated data. The bitstream may comprise a sequence of Network Abstraction Layer (NAL) units. A NAL unit is a syntax structure containing an indication of the type of data in the NAL unit and bytes containing that data in the form of a raw byte sequence payload (RBSP) interspersed as necessary with emulation prevention bits. Each of the NAL units includes a NAL unit header and encapsulates a RBSP. The NAL unit header may include a syntax element that indicates a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Different types of NAL units may encapsulate different types of RBSPs. For example, a first type of NAL unit may encapsulate an RBSP for a PPS, a second type of NAL unit may encapsulate an RBSP for a coded slice, a third type of NAL unit may encapsulate an RBSP for SEI messages, and so on. NAL units that encapsulate RBSPs for video coding data (as opposed to RBSPs for parameter sets and SEI messages) may be referred to as VCL NAL units.

Video decoder 30 may receive a bitstream generated by video encoder 20. In addition, video decoder 30 may parse the bitstream to obtain syntax elements from the bitstream. Video decoder 30 may reconstruct the pictures of the video data based at least in part on the syntax elements obtained from the bitstream. The process to reconstruct the video data may be generally reciprocal to the process performed by video encoder 20. In addition, video decoder 30 may inverse quantize coefficient blocks associated with TUs of a current CU. Video decoder 30 may perform inverse transforms on the coefficient blocks to reconstruct transform blocks associated with the TUs of the current CU. Video decoder 30 may reconstruct the coding blocks of the current CU by adding the samples of the predictive blocks for PUs of the current CU to corresponding samples of the transform blocks of the TUs of the current CU. By reconstructing the coding blocks for each CU of a picture, video decoder 30 may reconstruct the picture.

Aspects of CU structure and motion vector prediction in HEVC will now be described. In HEVC, the largest coding unit in a slice is called a coding tree block (CTB) or CTU. A CTB contains a quad-tree the nodes of which are coding units.

Figure 2:
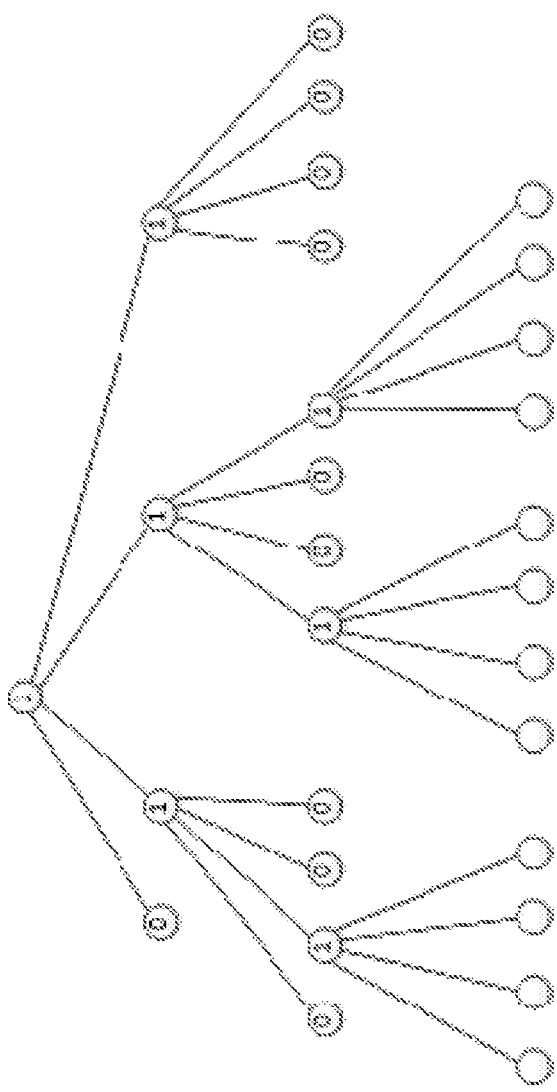
FIG. 2 shows an example of coding tree unit (CTU) to CU partitioning in HEVC and a corresponding quadtree representation.
Figure 2:
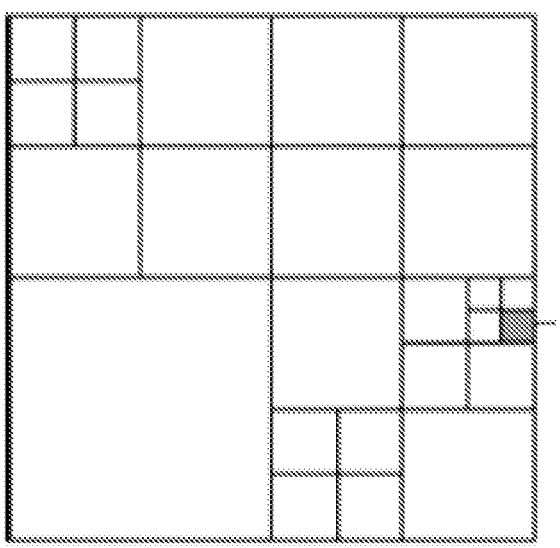

FIG. 2 shows an example of CTU-to-CU partitioning in HEVC and a corresponding quadtree representation. Note that no signaling is required when the leaf nodes correspond to 8×8 CU. Additional details are disclosed in G. J. Sullivan; J.-R. Ohm; W.-J. Han; T Wiegand (December 2012) "Overview of the High Efficiency Video Coding (HEVC) Standard" (PDF). IEEE Transactions on Circuits and Systems for Video Technology (IEEE) 22 (12), the entire content of which is incorporated herein by reference.

The size of a CTB can range from 16×16 to 64×64 in the HEVC main profile (although technically 8×8 CTB sizes can be supported). A coding unit (CU) may be the same size of a CTB although it can also be as small as 8×8. Each coding unit is coded with one mode. When a CU is inter coded, it may be further partitioned into 2 or 4 prediction units (PUs) or become just one PU when further partition does not apply. When two PUs are present in one CU, the PU can be half size rectangles or two rectangle sizes with ¼ or ¾ size of the CU. A CU could be the same size as a CTB although it can be as small as 8×8. Each coding unit is coded with one mode which could be either intra mode or inter mode. When a CU is inter coded (i.e., inter mode is applied), it may be further partitioned into 2 or 4 prediction units (PUs) or become just one PU when further partition does not apply. When two PUs are present in one CU, they can be half size rectangles or two rectangle sizes with ¼ or ¾ size of the CU.

When the CU is inter coded, one set of motion information is present for each PU. In addition, each PU is coded with a unique inter-prediction mode to derive the set of motion information. When the CU is inter coded, one set of motion information is present for each PU. In addition, each PU is coded with a unique inter-prediction mode to derive the set of motion information. When a CU is intra coded, 2N×2N and N×N are the only permissible PU shapes, and within each PU a single intra prediction mode is coded (while chroma prediction mode is signaled at CU level). The N×N intra PU shapes are only allowed when the current CU size is equal to the smallest CU size defined in the Sequence Parameter Set (SPS).

Figure 3:
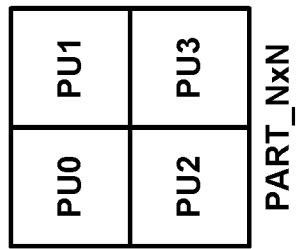
FIG. 3 shows an example of partition modes for inter prediction mode.
Figure 3:
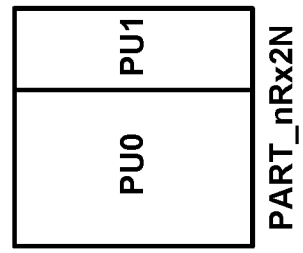
Figure 3:
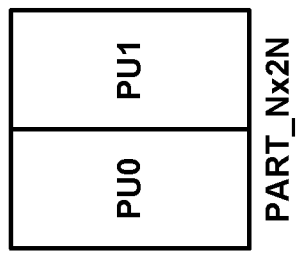
Figure 3:
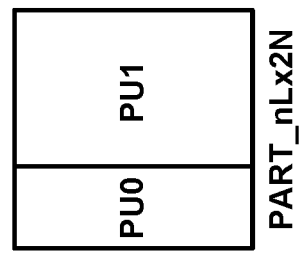
Figure 3:
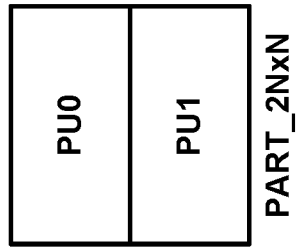
Figure 3:
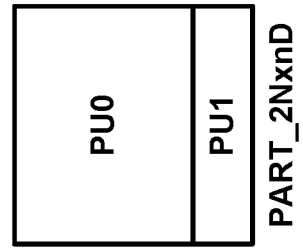
Figure 3:
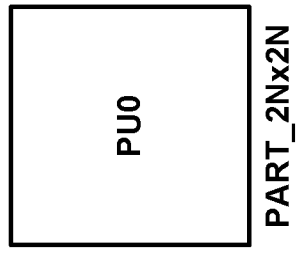

FIG. 3 shows an example of partition modes for inter prediction mode. There are eight partition modes for CU coded with inter prediction mode, i.e., PART_2N×2N, PART_2N×N, PART_N×2N, PART_N×N, PART_2N×nU, PART_2N×nD, PART_nL×2N and PART_nR×2N, shown in FIG. 3.

Future video coding standards may utilize CU structures and motion vector prediction techniques that are different than those presently used in HEVC. One such example of an alternate CU structure and motion vector prediction relates to quad-tree-binary-tree structure. In VCEG proposal COM16-C966, available at JCTVC-L1003_ v34, http://phenix.it-sudparis.eu/jct/doc_end_user/documents/12_Geneva/ wg11/JCTVC-L1003-v34.zip and incorporated herein by reference in its entirety, a quad-tree-binary-tree (QTBT) was proposed for future video coding standards beyond HEVC. Simulations showed the proposed QTBT structure may be more efficient than the quad-tree structure used in HEVC.

In the proposed QTBT structure, a CTB is firstly partitioned by quad-tree, where the quad-tree splitting of one node can be iterated until the node reaches the minimum allowed quad-tree leaf node size (MinQTSize). If the quad-tree leaf node size is not larger than the maximum allowed binary tree root node size (MaxBTSize), it can be further partitioned by a binary tree. The binary tree splitting of one node can be iterated until the node reaches the minimum allowed binary tree leaf node size (MinBTSize) or the maximum allowed binary tree depth (MaxBTDepth). The binary tree leaf node is namely CU which will be used for prediction (e.g. intra-picture or inter-picture prediction) and transform without any further partitioning. There are two splitting types, symmetric horizontal splitting and symmetric vertical splitting, in the binary tree splitting.

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quad-tree leaf nodes may have a size from 16×16 (i.e., the MinQTSize) to 128×128 (i.e., the CTU size). If the leaf quad-tree node is 128×128, it will not be further split by the binary tree since the size exceeds the MaxBTSize (i.e., 64×64). Otherwise, the leaf quad-tree node will be further partitioned by the binary tree. Therefore, the quad-tree leaf node is also the root node for the binary tree and has the binary tree depth as 0. When the binary tree depth reaches MaxBTDepth (i.e., 4), it implies that no further splitting is performed. When the binary tree node has width equal to MinBTSize (i.e., 4), it implies no further horizontal splitting. Similarly, when the binary tree node has height equal to MinBTSize, it implies no further vertical splitting. The leaf nodes of the binary tree are namely CUs further processed by prediction and transform without any further partitioning.

Figure 4A:
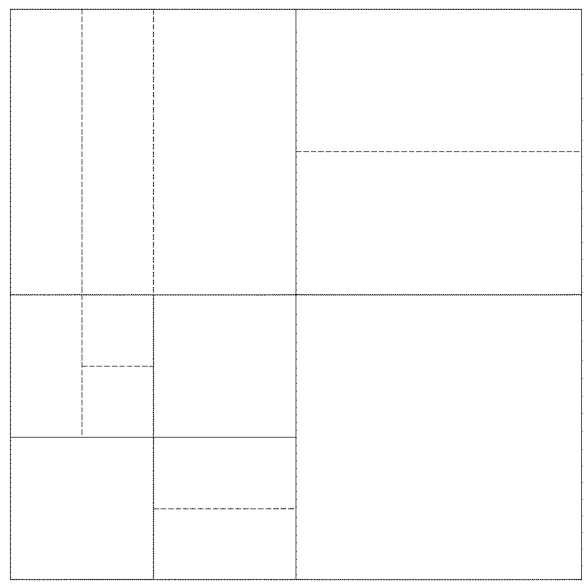
FIGS. 4A and 4B show an example of an illustration of a quad-tree-binary-tree (QTBT) structure.
Figure 4B:
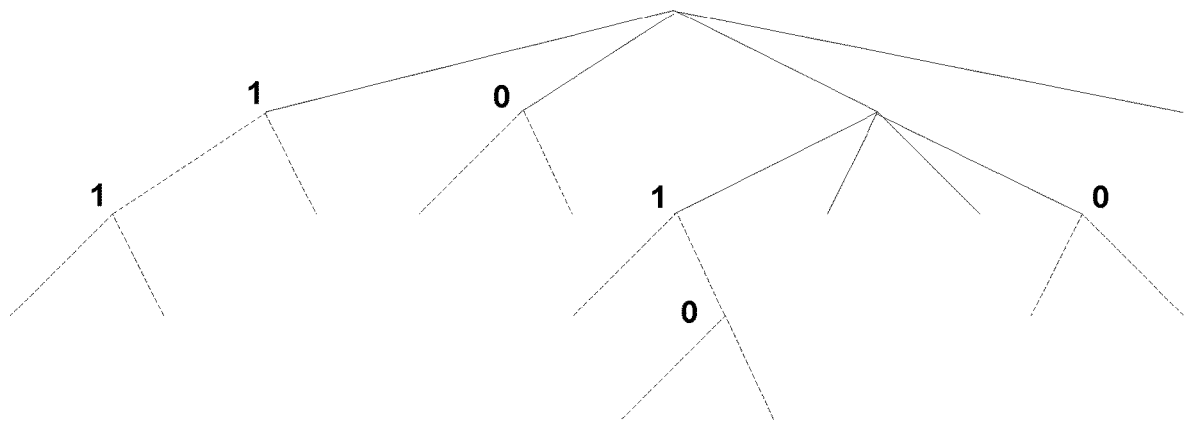

FIGS. 4A and 4B show an example illustration of a QTBT structure. FIG. 4A illustrates an example of block partitioning by using QTBT, and FIG. 4B illustrates the corresponding tree structure. The solid lines indicate quad-tree splitting and dotted lines indicate binary tree splitting. In each splitting (i.e., non-leaf) node of the binary tree, one flag is signaled to indicate which splitting type (i.e., horizontal or vertical) is used, where 0 indicates horizontal splitting and 1 indicates vertical splitting. For the quad-tree splitting, there is no need to indicate the splitting type since it always splits a block horizontally and vertically into 4 sub-blocks with an equal size.

Figure 5:
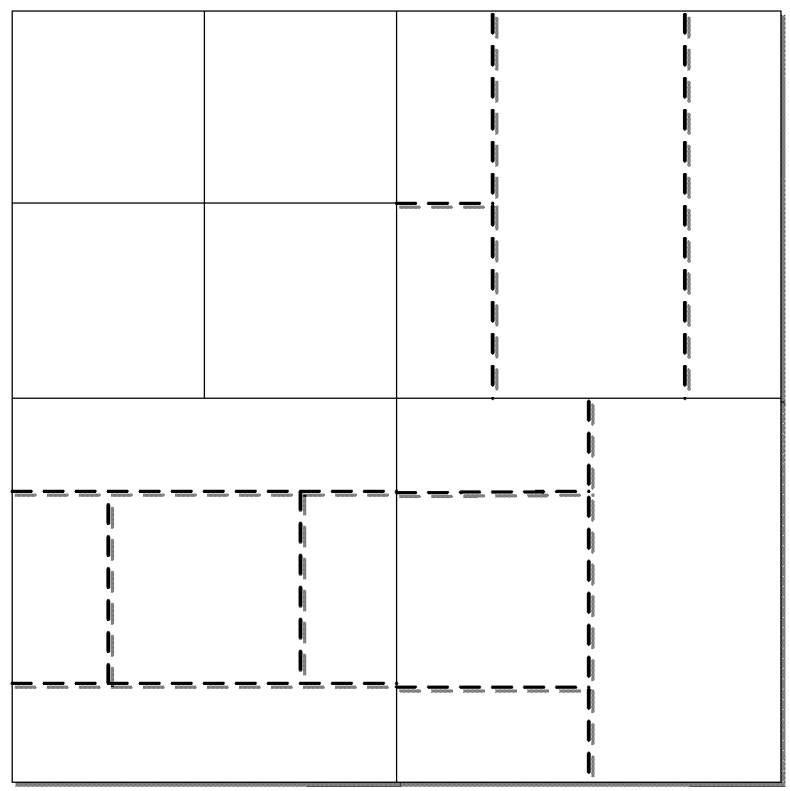
FIG. 5 shows an example of an illustration of a multi-type-tree structure.
Figure 5:
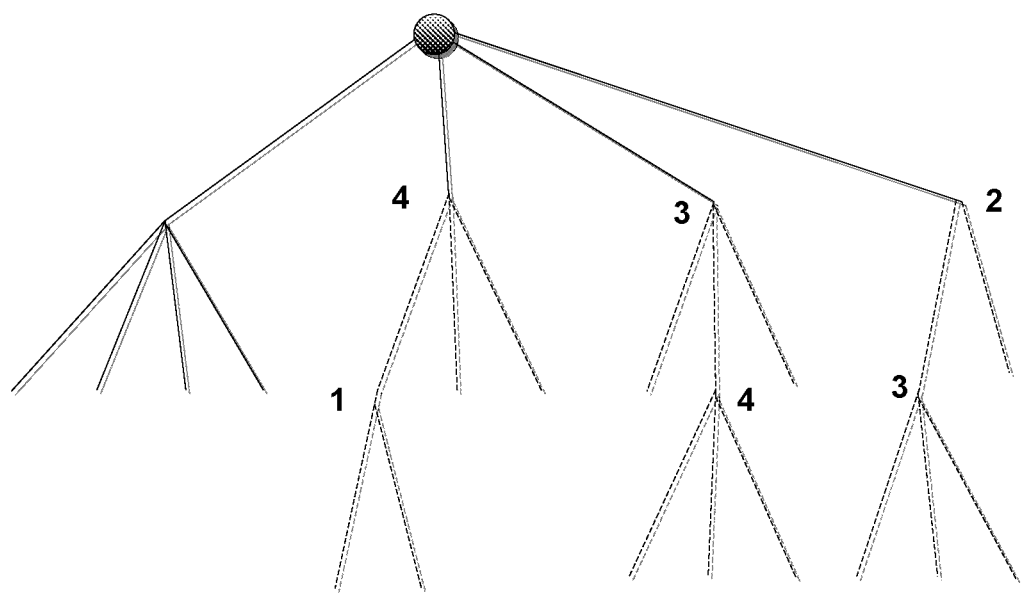

Aspects of multi-type-tree structure will now be described. FIG. 5 shows an example of an illustration of a multi-type-tree structure. According to the technique of FIG. 5, a tree node may be further split with multiple tree types, such as binary tree, symmetric center-side triple tree, and quad-tree. In the two-level multi-type-tree structure, Region Tree (RT) is constructed first with quadtree partitions of a CTU, followed by the construction of Prediction Tree (PT), where only binary tree and the symmetric center-side triple tree can be expanded. FIG. 5 illustrates one example of the multi-type-tree block partition.

Compared to the CU structure in HEVC and the QTBT structure, multi-tree-type structure provides better coding efficiency as the block partitions are more flexible. In addition, the introduction of the center-side triple tree provides more flexible localization of video signals. In the multi-tree-type structure, three bins are required to determine the block partition at each PT node (except for conditions where some constraints can be imposed) to represent block partitions of non-split, horizontal binary tree, vertical binary tree, horizontal triple tree, and vertical tree. This, along with the new triple partitions from the triple tree, increases the required number of bits to signal the tree types.

Video encoder 20 and video decoder 30 may be configured to perform motion vector prediction. In HEVC standard, there are two inter prediction modes, named merge (skip is considered as a special case of merge) and advanced motion vector prediction (AMVP) modes respectively for a prediction unit (PU). In either AMVP or merge mode, a motion vector (MV) candidate list is maintained for multiple motion vector predictors. The motion vector(s), as well as reference indices in the merge mode, of the current PU are generated by taking one candidate from the MV candidate list.

The MV candidate list contains up to 5 candidates for the merge mode and only two candidates for the AMVP mode. A merge candidate may contain a set of motion information, e.g., motion vectors corresponding to both reference picture lists (list 0 and list 1) and the reference indices. If a merge candidate is identified by a merge index, the reference pictures are used for the prediction of the current blocks, as well as the associated motion vectors are determined. However, under AMVP mode for each potential prediction direction from either list 0 or list 1, a reference index needs to be explicitly signaled, together with an MV predictor (MVP) index to the MV candidate list since the AMVP candidate contains only a motion vector. In AMVP mode, the predicted motion vectors can be further refined.

A merge candidate corresponds to a full set of motion information while an AMVP candidate contains just one motion vector for a specific prediction direction and reference index. The candidates for both modes are derived similarly from the same spatial and temporal neighboring blocks.

Figure 6B:
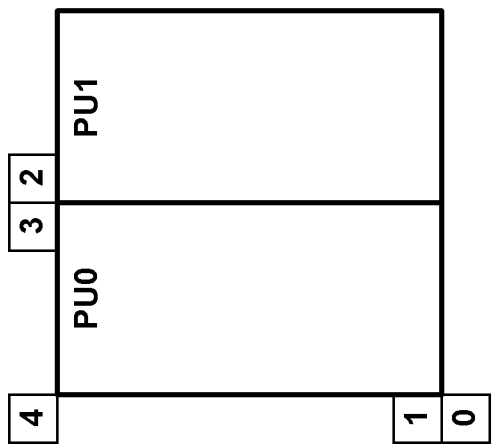
FIG. 6B shows an example of spatial neighboring MV candidates for advanced motion vector prediction (AMVP) mode.
Figure 6A:
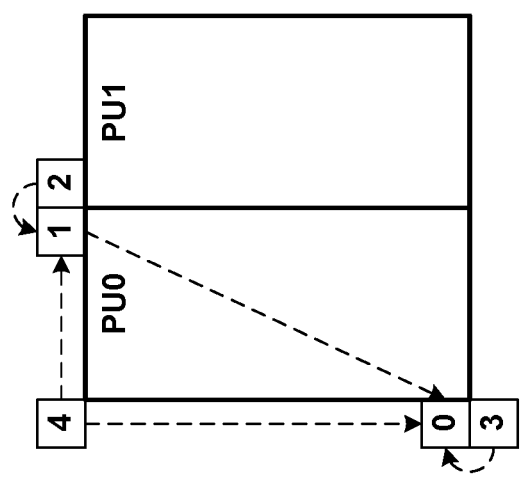
FIG. 6A shows an example of spatial neighboring motion vector (MV) candidates for merge mode.

FIG. 6A shows an example of spatial neighboring MV candidates for merge mode, and FIG. 6B shows an example of spatial neighboring MV candidates for AMVP mode. Spatial MV candidates are derived from the neighboring blocks shown in FIGS. 6A and 6B, for a specific PU (PUo), although the methods generating the candidates from the blocks differ for merge and AMVP modes.

In merge mode, up to four spatial MV candidates can be derived with the orders shown in FIG. 6A with numbers, and the order is the following: left (0, A1), above (1, B1), above right (2, B0), below left (3, A0), and above left (4, B2), as shown in FIG. 6A.

In AVMP mode, the neighboring blocks are divided into two groups: left group consisting of the block 0 and 1, and above group consisting of the blocks 2, 3, and 4 as shown in FIG. 6B. For each group, the potential candidate in a neighboring block referring to the same reference picture as that indicated by the signaled reference index has the highest priority to be chosen to form a final candidate of the group. It is possible that all neighboring blocks do not contain a motion vector pointing to the same reference picture. Therefore, if such a candidate cannot be found, the first available candidate will be scaled to form the final candidate; thus, the temporal distance differences can be compensated.

Temporal motion vector predictor (TMVP) candidate, if enabled and available, is added into the MV candidate list after spatial motion vector candidates. The process of motion vector derivation for TMVP candidate is the same for both merge and AMVP modes; however, the target reference index for the TMVP candidate in the merge mode is always set to 0.

Figure 7B:
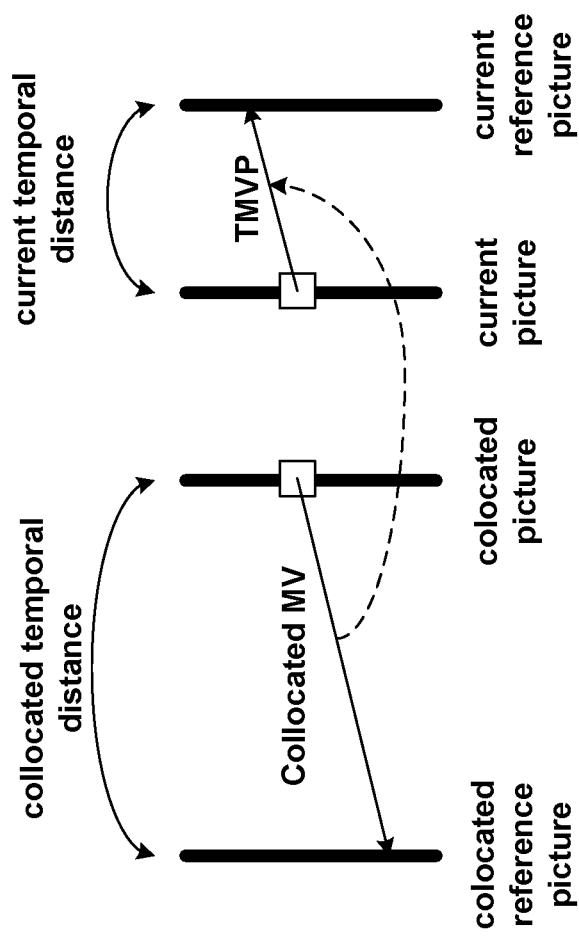
FIG. 7B shows an example of MV scaling.
Figure 7A:
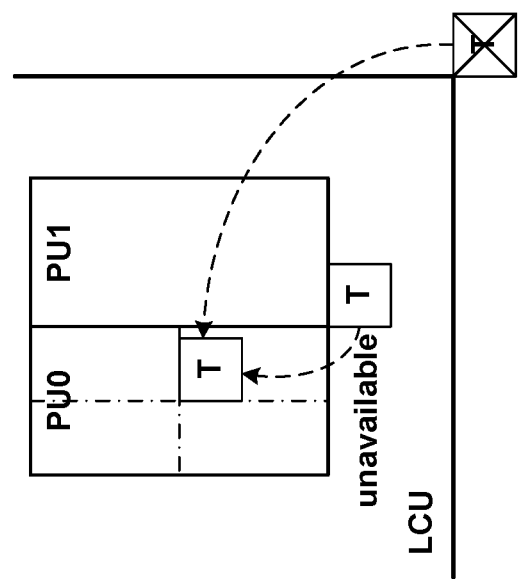
FIG. 7A shows an example of a Temporal motion vector predictor (TMVP) candidate.

The primary block location for TMVP candidate derivation is the bottom right block outside of the collocated PU as shown in FIG. 7A as a block "T", to compensate the bias to the above and left blocks used to generate spatial neighboring candidates. However, if that block is located outside of the current CTB row or motion information is not available, the block is substituted with a center block of the PU.

FIG. 7A shows an example of a TMVP candidate, and FIG. 7B shows an example of MV scaling. A motion vector for the TMVP candidate is derived from the co-located PU of the co-located picture, indicated in the slice level. The motion vector for the co-located PU is called collocated MV. Similar to temporal direct mode in AVC, to derive the TMVP candidate motion vector, the co-located MV needs to be scaled to compensate the temporal distance differences, as shown in FIG. 7B.

Pattern matched motion vector derivation (PMMVD) mode is a special merge mode based on Frame-Rate Up Conversion (FRUC) techniques. With this mode, motion information of a block is not signaled but derived at decoder side. This technology was included in JEM.

A FRUC flag is signaled for a CU when its merge flag is true. When the FRUC flag is false, a merge index is signaled and the regular merge mode is used. When the FRUC flag is true, an additional FRUC mode flag is signaled to indicate which method (bilateral matching or template matching) is to be used to derive motion information for the block.

During the motion derivation process, an initial motion vector is first derived for the whole CU based on bilateral matching or template matching. First, the merge list of the CU, or called PMMVD seeds, is checked and the candidate which leads to the minimum matching cost is selected as the starting point. Then a local search based on bilateral matching or template matching around the starting point is performed and the MV that results in the minimum matching cost is taken as the MV for the whole CU. Subsequently, the motion information is further refined at sub-block level with the derived CU motion vectors as the starting points.

Figure 8:
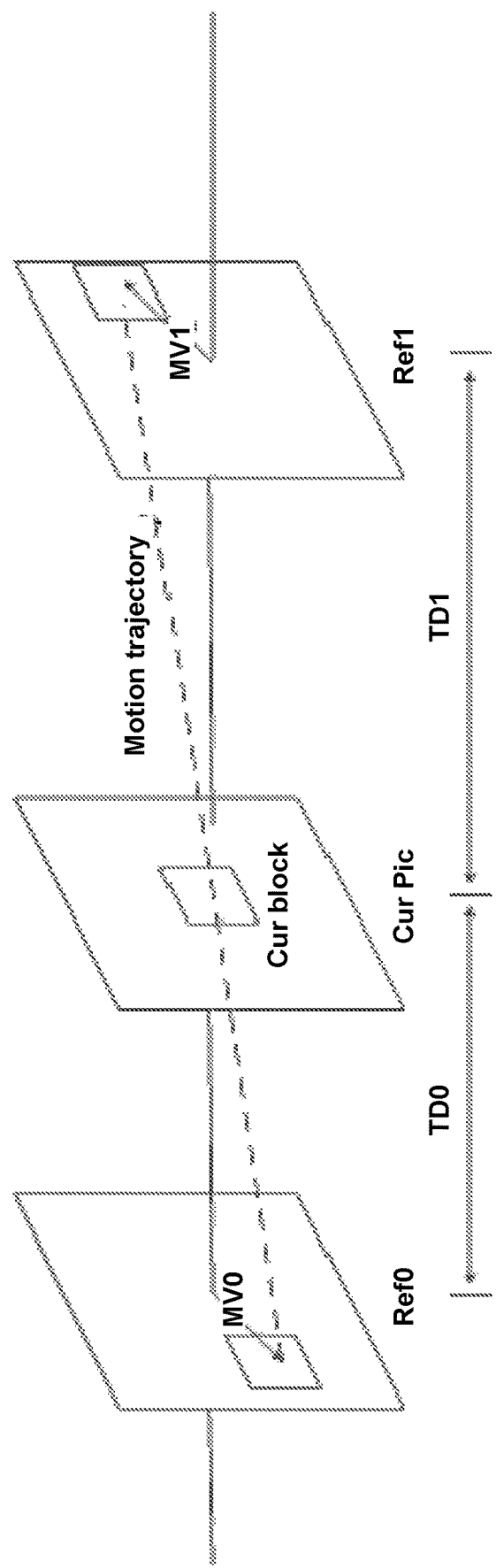
FIG. 8 shows an example of Bilateral matching.

FIG. 8 shows an example of Bilateral matching. As shown in FIG. 8, the bilateral matching is used to derive motion information of the current block by finding the best match between two blocks along the motion trajectory of the current block in two different reference pictures. Under the assumption of continuous motion trajectory, the motion vectors MV0 and MV1 pointing to the two reference blocks shall be proportional to the temporal distances, i.e., TD0 and TD1, between the current picture and the two reference pictures. As a special case, when the current picture is temporally between the two reference pictures and the temporal distance from the current picture to the two reference pictures is the same, the bilateral matching becomes mirror based bi-directional MV.

Figure 9:
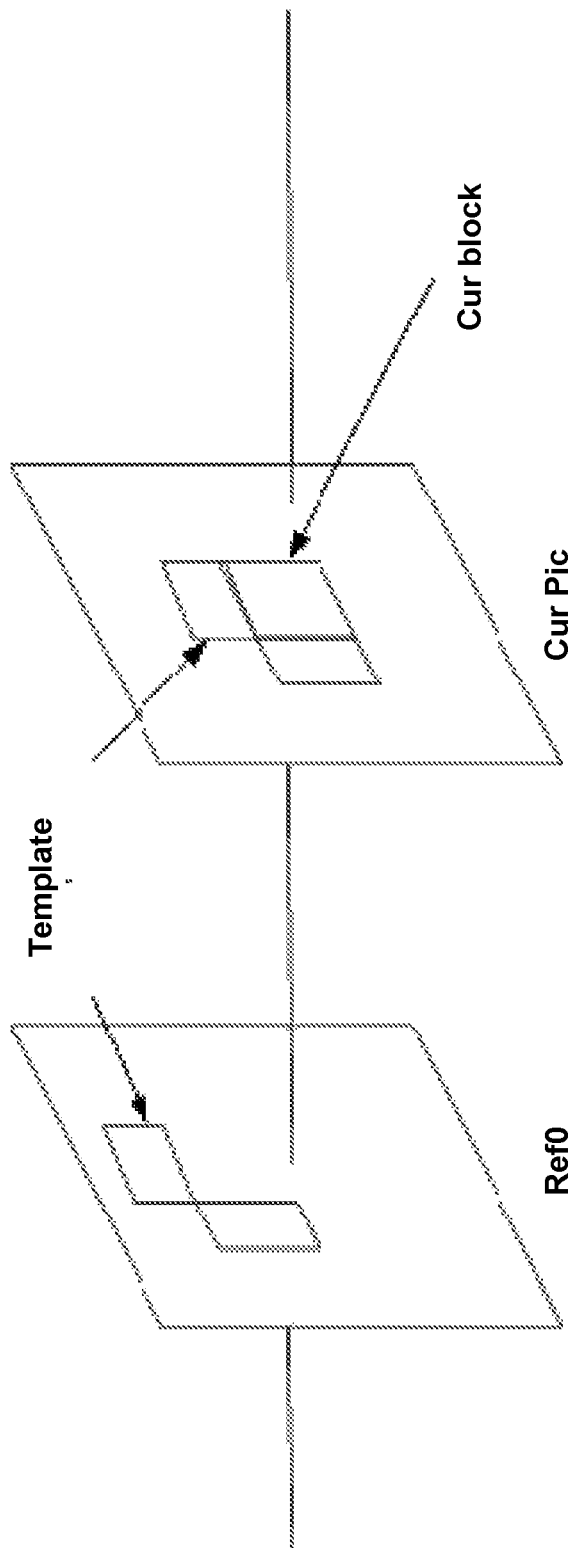
FIG. 9 shows an example of template matching.

FIG. 9 shows an example of template matching. As shown in FIG. 9, template matching is used to derive motion information of the current block by finding the best match between a template (top and/or left neighboring blocks of the current block) in the current picture and a block (same size to the template) in a reference picture.

At encoder side (e.g., at video encoder 20), the decision on whether to use FRUC merge mode for a CU is based on rate-distortion (RD) cost selection as done for normal merge candidate. That is, the two matching modes (bilateral matching and template matching) are both checked for a CU by using RD cost selection. The one leading to the minimal cost is further compared to other CU modes. If a FRUC matching mode is the most efficient one, FRUC flag is set to true for the CU and the related matching mode is used.

Other aspects of motion prediction in HEVC will now be described. Several aspects of merge and AMVP modes are worth mentioning as follows. With motion vector scaling, it is assumed that the value of motion vectors is proportional to the distance of pictures in the presentation time. A motion vector associates two pictures, the reference picture, and the picture containing the motion vector (namely the containing picture). When a motion vector is utilized to predict the other motion vector, the distance of the containing picture and the reference picture is calculated based on the Picture Order Count (POC) values.

For a motion vector to be predicted, both its associated containing picture and reference picture may be different. Therefore, a new distance (based on POC) is calculated. And the motion vector is scaled based on these two POC distances. For a spatial neighboring candidate, the containing pictures for the two motion vectors are the same, while the reference pictures are different. In HEVC, motion vector scaling applies to both TMVP and AMVP for spatial and temporal neighboring candidates.

With artificial motion vector candidate generation, if a motion vector candidate list is not complete, artificial motion vector candidates are generated and inserted at the end of the list until it will have all candidates. In merge mode, there are two types of artificial MV candidates: combined candidate derived only for B-slices and zero candidates used only for AMVP if the first type does not provide enough artificial candidates. For each pair of candidates that are already in the candidate list and have necessary motion information, bi-directional combined motion vector candidates are derived by a combination of the motion vector of the first candidate referring to a picture in the list 0 and the motion vector of a second candidate referring to a picture in the list 1.

With respect to the pruning process for candidate insertion, candidates from different blocks may happen to be the same, which decreases the efficiency of a merge/AMVP candidate list. A pruning process is applied to solve this problem. The pruning process compares one candidate against the others in the current candidate list to avoid inserting identical candidates in certain extent. To reduce the complexity, only a limited numbers of pruning processes may be applied instead of comparing each potential one with all the other existing ones.

Aspect of an encoding algorithm in JEM will now be described. When an encoder (e.g., video encoder 20) encodes a block, it evaluates several methods, such as different partition trees, a variety of coding tools, and so on, and chooses the best method that achieves the best performance. Therefore, the same block will be tested several times for different partition trees and coding tools. For each test, video encoder 20 does a motion estimation in a large search range, also referred to as a search window, to find the best motion vector. As a result, many motion estimations with large search window need to be conducted. To reduce encoding complexity, a fast method is applied in JEM. For a block, motion estimation with large search window is only conducted in the first test, and the resulting motion vector is stored. Whenever the block is tested for any future event, motion estimation with a small search window around the stored motion vector is applied regardless of the type of coding tools being applied.

The design of HEVC/JEM may have some potential problems. As one example, a block uses only its local information, e.g., spatial/temporal neighboring candidates, to predict motion. However, correlation exists between the motion of a block and that of a larger block covering the block, i.e., the global information. As another example, the fast encoding algorithm reuses the estimated motion vectors for different setting regardless of the coding tools being applied. However, the best motion vector may be different among different tool settings.

This disclosure introduces a concept called parent motion. For a block, its parent motion is the motion of a larger block (named parent block) covering the block. Because the parent block contains more pixels, its motion contains more information than that of a small block. By utilizing the parent motion, the motion coding can be improved. The example methods, with respect to parent blocks (as an example), may be applied to certain block sizes, e.g., coding units that are no larger than 16×16 samples.

Figure 10:
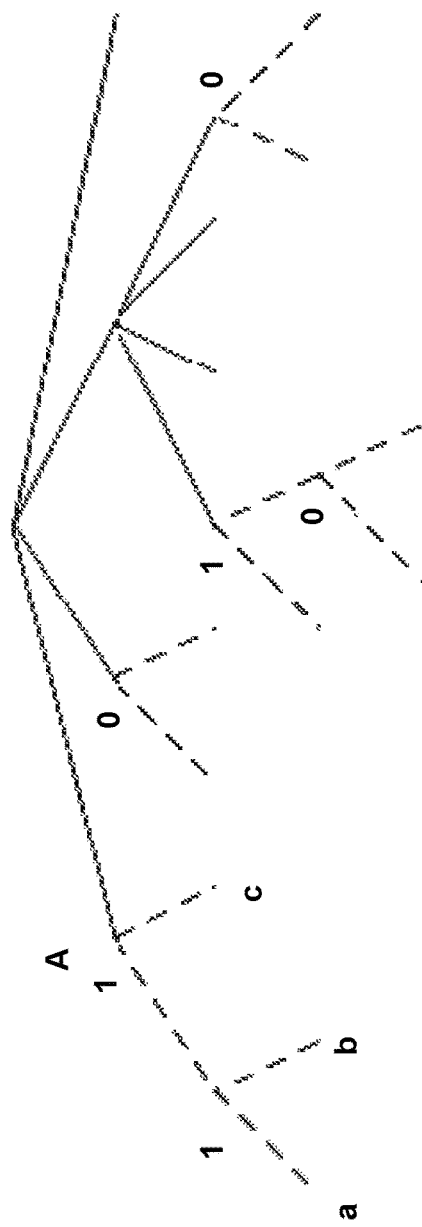
FIG. 10 shows an example of parent motion.
Figure 10:
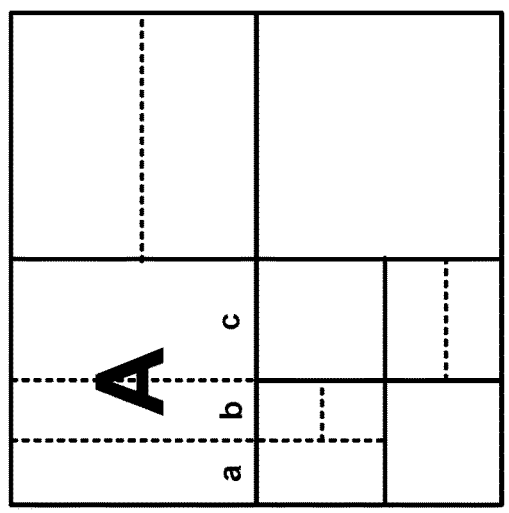

FIG. 10 shows an example of parent motion. When implementing techniques of this disclosure, video encoder 20 and a video decoder 30 can use the parent motion to improve motion vector coding. This disclosure describes several methods whereby video decoder 30 can obtain the parent motion information. Then, the parent motion on the decoder side can potentially improve motion vector coding in manners described in more detail below.

Aspects of parent motion on the decoder side will now be described. In some examples, explicit coding of parent motion may be utilized. In order for the decoder side (e.g., video decoder 30) to have parent motion information, this disclosure proposes techniques for signaling parent motion information on a parent block so that its child blocks (smaller blocks covered by the parent block) may use the signaled motion as the parent motion information. FIG. 10 shows an example. According to techniques of this disclosure, parent motion information on block A, i.e., the parent block, can be signaled. Then, child blocks, e.g., a, b, and c, may use the signaled motion as the parent motion. Therefore, as a first improvement in motion vector coding, instead of signaling parent motions on all the blocks, one parent motion can be signaled on a large block and shared among the sub-blocks.

In another example, one or more sets of global motion information may be signaled in sequence parameter set, picture parameter set, slice/picture header. For parent motion to be utilized, it may be selected from one or more sets of global motion information. Alternatively, predictive coding of parent motion and global motion information may be utilized to save the signaling cost of parent motion.

In some examples, video decoder 30 may utilize implicit coding of parent motion. Another method (e.g., a second improvement in motion vector coding) to get parent motion is that the decoder can derive the parent motion without being explicitly signaled. An example is that, video decoder 30 can use PMMVD to derive a motion vector and use the vector as the parent motion. In FIG. 10, video decoder 30 can apply PMMVD on block A to derive a motion vector. The derived motion vector is then treated as the parent motion of its sub-blocks, a, b, and c. Furthermore, video decoder 30 may use only partial information in a block to derive parent motion. In one example, block may be split into N sub-blocks, and video decoder 30 may only use M (M=1 . . . N) to derive the parent motion for the parent block. Alternatively, the motion information of spatial/temporal neighboring blocks of parent block may be utilized as the parent motion.

In some examples, a combination of explicit and implicit coding of parent motion may be utilized. Alternatively, a flag to indicate whether the parent motion is signaled by the encoder or derived by the decoder may be signaled.

The level at which the parent motion is obtained, denoted as the PMV level, may be derived or signaled. An example is that, the motion can be signaled/derived for each CTU, and all sub-blocks under the CTU use the signaled motion as their parent motion. Therefore, block A in FIG. 10 can be a CTU. In other words, the PMV level can be predefined as any specific level. Alternatively, the PMV level can be signaled, for example, per one or several slices.

Aspects of motion vector coding by the parent motion will now be described. As video decoder 30 can get the parent motion, this disclosure describes techniques such that video decoder 30 can use the parent motion to improve motion vector coding. In one example, the parent motion may be inserted into the motion vector predictor list as an additional motion vector predictor after a potential pruning process, but the pruning process is not necessary in all examples. Therefore, the motion vector of a block can be predicted from the larger block. Alternatively, furthermore, the size of AMVP candidate list may be increased.

In another example, the parent motion can be inserted into the PMMVD seed list. The PMMVD can use the parent motion as a new initial point for motion vector derivation. Since the parent motion from a larger block contains more information, the derived motion might be more reliable. As a result, the performance may potentially be improved.

This disclosure also describes techniques for an improved fast encoding method that may be performed by video encoders such as video encoder 20. Instead of storing one motion vector for all coding tools, this disclosure introduces techniques for video encoder 20 to store different motion vectors for different coding tool settings. In one example, video encoder 20 may conduct motion estimation with the same search window several times to acquire motion vectors for each tool setting. To reduce complexity, for a tool setting, this disclosure introduces techniques to perform a small range motion estimation according to the stored motion vector of the other tool settings which have been tested before.

An example is that, in JEM, there are two tools, illumination compensation (IC), also referred to as local illumination compensation (LIC), and integer motion vector (IMV). To store accurate motion vectors, motion estimation is conducted with the same search range (e.g., 256×256, as defined by integer pixel locations) four times for the settings of IC-off-IMV-off, IC-on-IMV-off, IC-off-IMV-on, and IC-on-IMV-on. To reduce complexity, this disclosure includes techniques to first conduct a large range motion estimation (e.g., 256×256) for the setting of IC-off-IMV-off. Based on the resulting motion vector, the techniques include conducting a small range motion estimation (e.g., 8×8) to obtain motion vectors for the other tool settings. Furthermore, the techniques include applying different small range motion estimations for different tool settings. For example, the motion vector of turning on IC is less correlated to the vector of turning off IC. Therefore, the techniques of this disclosure include conducting large range motion estimation twice for the settings of IC-off-IMV-off and IC-on-IMV-off. The techniques of this disclosure then include conducting a small range motion estimation for the setting of IC-off-IMV-on and IC-on-IMV-on according to the stored motion vector of the setting IC-off-IMV-off and IC-on-IMV-off, respectively.

LIC is a coding tool that utilizes a linear model for illumination changes, using a scaling factor a and an offset b. In JEM, LIC is enabled or disabled adaptively for each inter-mode coded CU.

When the IMV restriction described above is enabled, video encoder 20 and video decoder 30 only use integer motion vector precision. Therefore, the bit overhead associated with signaling fractional motion vector precisions and the computational complexity associated with interpolation filtering can be avoided or reduced.

Figure 11:
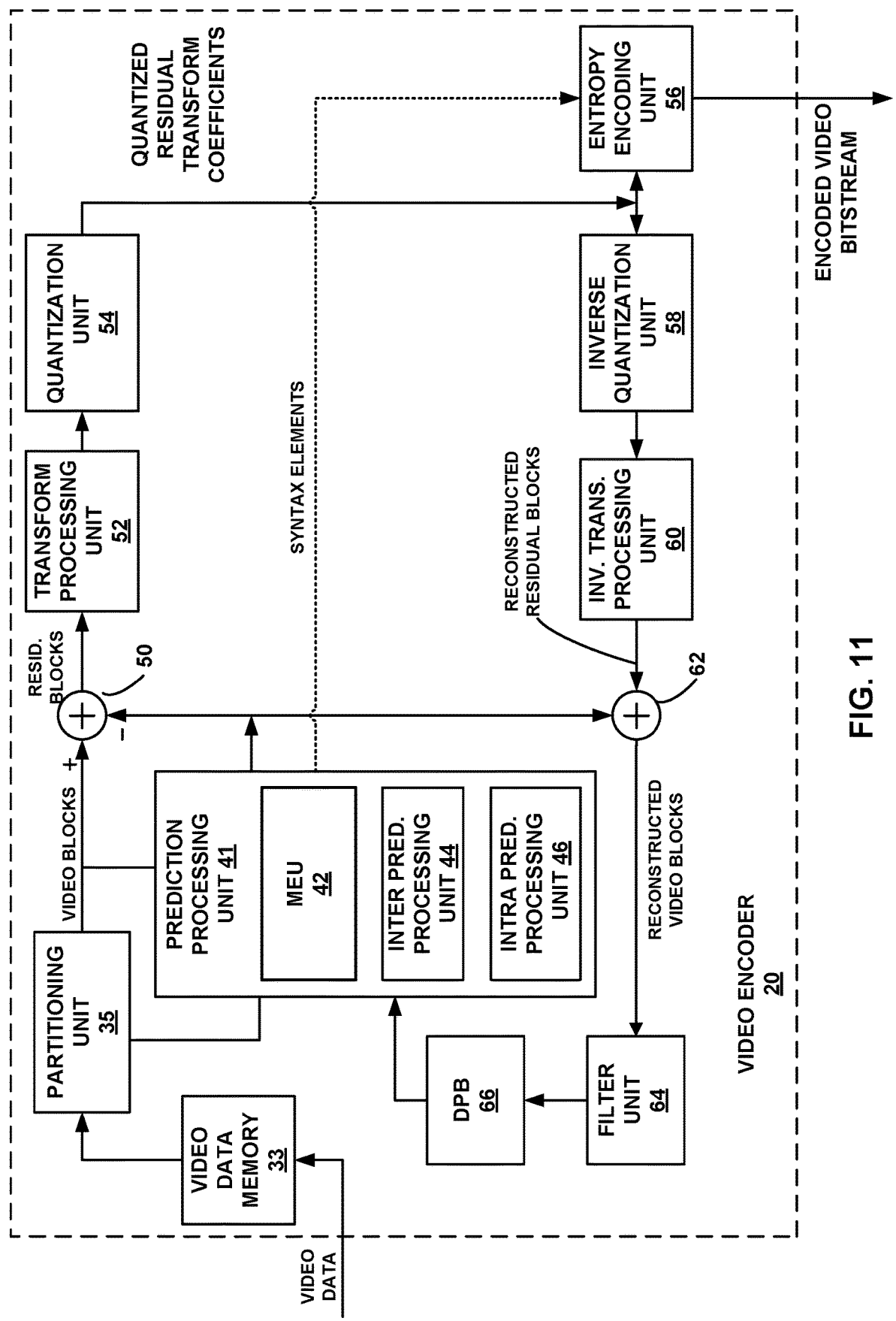
FIG. 11 is a block diagram illustrating an example video encoder that may implement the techniques described in this disclosure.

FIG. 11 is a block diagram illustrating an example video encoder 20 that may implement the techniques described in this disclosure. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

In the example of FIG. 11, video encoder 20 includes a video data memory 33, partitioning unit 35, prediction processing unit 41, summer 50, transform processing unit 52, quantization unit 54, entropy encoding unit 56. Prediction processing unit 41 includes motion estimation unit (MEU) 42, motion compensation unit (MCU) 44, and intra prediction unit 46. For video block reconstruction, video encoder 20 also includes inverse quantization unit 58, inverse transform processing unit 60, summer 62, filter unit 64, and decoded picture buffer (DPB) 66.

As shown in FIG. 11, video encoder 20 receives video data and stores the received video data in video data memory 33. Video data memory 33 may store video data to be encoded by the components of video encoder 20. The video data stored in video data memory 33 may be obtained, for example, from video source 18. DPB 66 may be a reference picture memory that stores reference video data for use in encoding video data by video encoder 20, e.g., in intra- or inter-coding modes. Video data memory 33 and DPB 66 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 33 and DPB 66 may be provided by the same memory device or separate memory devices. In various examples, video data memory 33 may be on-chip with other components of video encoder 20, or off-chip relative to those components.

Partitioning unit 35 retrieves the video data from video data memory 33 and partitions the video data into video blocks. This partitioning may also include partitioning into slices, tiles, or other larger units, as wells as video block partitioning, e.g., according to a quadtree structure of LCUs and CUs. Video encoder 20 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra coding modes or one of a plurality of inter coding modes, for the current video block based on error results (e.g., coding rate and the level of distortion). Prediction processing unit 41 may provide the resulting intra- or inter-coded block to summer 50 to generate residual block data and to summer 62 to reconstruct the encoded block for use as a reference picture.

Intra prediction unit 46 within prediction processing unit 41 may perform intra-predictive coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices or B slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in DPB 66. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in DPB 66. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in one of the reference picture lists. Video encoder 20 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by video decoder 30 in decoding the video blocks of the video slice.

After prediction processing unit 41 generates the predictive block for the current video block, either via intra prediction or inter prediction, video encoder 20 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. In another example, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Following the entropy encoding by entropy encoding unit 56, the encoded bitstream may be transmitted to video decoder 30, or archived for later transmission or retrieval by video decoder 30. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within one of the reference picture lists. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed block.

Filter unit 64 filters the reconstructed block (e.g. the output of summer 62) and stores the filtered reconstructed block in DPB 66 for uses as a reference block. The reference block may be used by motion estimation unit 42 and motion compensation unit 44 as a reference block to inter-predict a block in a subsequent video frame or picture. Although not explicitly shown in FIG. 11, video encoder 20 may include additional filters such as a deblock filter, a sample adaptive offset (SAO) filter, or other types of loop filters. A deblock filter may, for example, apply deblocking filtering to filter block boundaries to remove blockiness artifacts from reconstructed video. An SAO filter may apply offsets to reconstructed pixel values in order to improve overall coding quality. Additional loop filters (in loop or post loop) may also be used.

Figure 12:
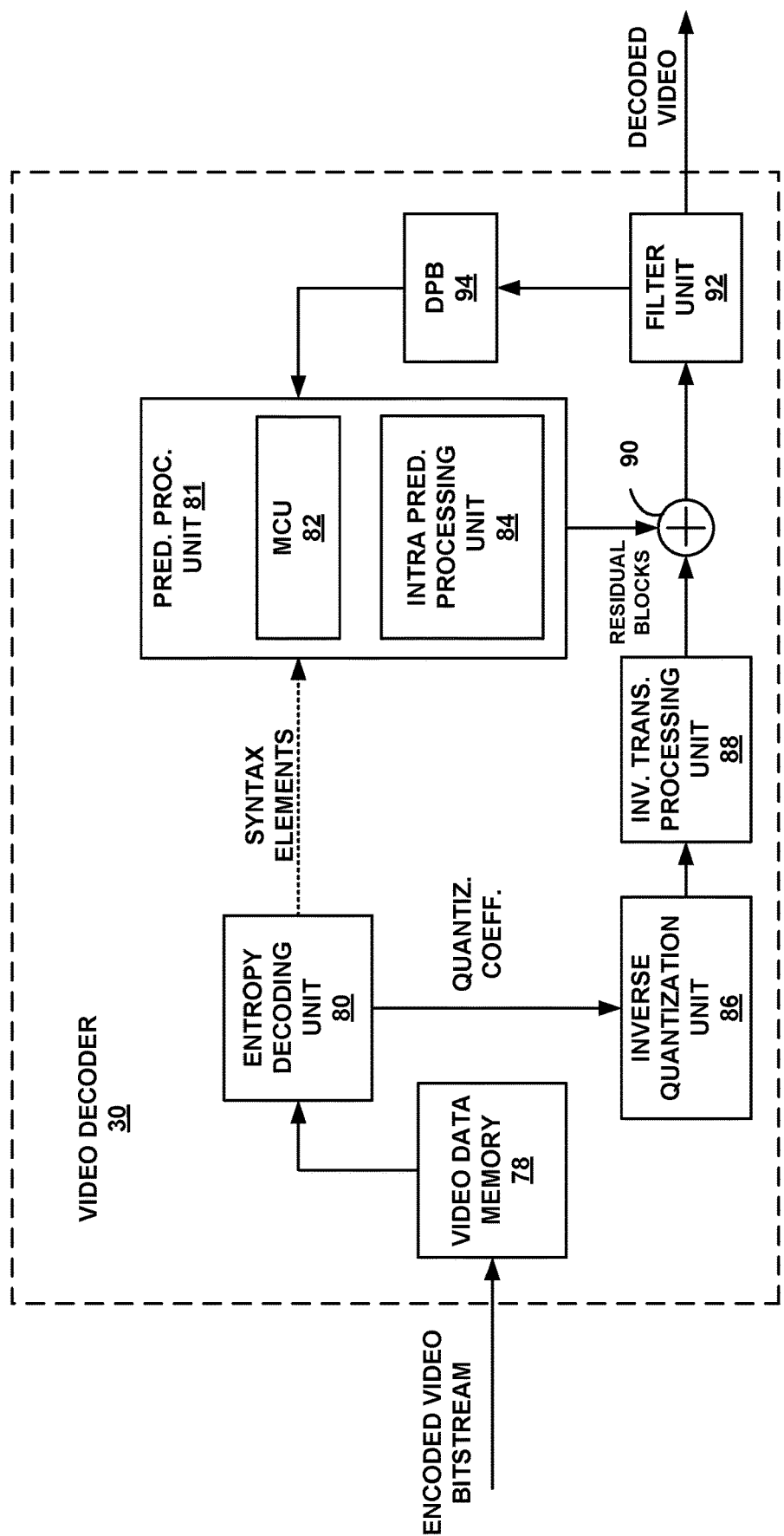
FIG. 12 is a block diagram illustrating an example video decoder that may implement the techniques described in this disclosure.

FIG. 12 is a block diagram illustrating an example video decoder 30 that may implement the techniques described in this disclosure. Video decoder 30 of FIG. 12 may, for example, be configured to receive the signaling described above with respect to video encoder 20 of FIG. 11. In the example of FIG. 12, video decoder 30 includes video data memory 78, entropy decoding unit 80, prediction processing unit 81, inverse quantization unit 86, inverse transform processing unit 88, summer 90, filter unit 92, and DPB 94. Prediction processing unit 81 includes motion compensation unit 82 and intra prediction processing unit 84. Video decoder 30 may, in some examples, perform a decoding pass generally reciprocal to the encoding pass described with respect to video encoder 20 from FIG. 11.

During the decoding process, video decoder 30 receives an encoded video bitstream that represents video blocks of an encoded video slice and associated syntax elements from video encoder 20. Video decoder 20 stores the received encoded video bitstream in video data memory 78. Video data memory 78 may store video data, such as an encoded video bitstream, to be decoded by the components of video decoder 30. The video data stored in video data memory 78 may be obtained, for example, via link 16, from storage device 26, or from a local video source, such as a camera, or by accessing physical data storage media. Video data memory 78 may form a coded picture buffer (CPB) that stores encoded video data from an encoded video bitstream. DPB 94 may be a reference picture memory that stores reference video data for use in decoding video data by video decoder 30, e.g., in intra- or inter-coding modes. Video data memory 78 and DPB 94 may be formed by any of a variety of memory devices, such as DRAM, SDRAM, MRAM, RRAM, or other types of memory devices. Video data memory 78 and DPB 94 may be provided by the same memory device or separate memory devices. In various examples, video data memory 78 may be on-chip with other components of video decoder 30, or off-chip relative to those components.

Entropy decoding unit 80 of video decoder 30 entropy decodes the video data stored in video data memory 78 to generate quantized coefficients, motion vectors, and other syntax elements. Entropy decoding unit 80 forwards the motion vectors and other syntax elements to prediction processing unit 81. Video decoder 30 may receive the syntax elements at the video slice level and/or the video block level.

When the video slice is coded as an intra-coded (I) slice, intra prediction processing unit 84 of prediction processing unit 81 may generate prediction data for a video block of the current video slice based on a signaled intra prediction mode and data from previously decoded blocks of the current frame or picture. When the video frame is coded as an inter-coded slice (e.g., B slice or P slice), motion compensation unit 82 of prediction processing unit 81 produces predictive blocks for a video block of the current video slice based on the motion vectors and other syntax elements received from entropy decoding unit 80. The predictive blocks may be produced from one of the reference pictures within one of the reference picture lists. Video decoder 30 may construct the reference frame lists, List 0 and List 1, using default construction techniques based on reference pictures stored in DPB 94.

Motion compensation unit 82 determines prediction information for a video block of the current video slice by parsing the motion vectors and other syntax elements, and uses the prediction information to produce the predictive blocks for the current video block being decoded. For example, motion compensation unit 82 uses some of the received syntax elements to determine a prediction mode (e.g., intra- or inter-prediction) used to code the video blocks of the video slice, an inter-prediction slice type (e.g., B slice or P slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by video encoder 20 during encoding of the video blocks to calculate interpolated values for sub-integer pixels of reference blocks. In this case, motion compensation unit 82 may determine the interpolation filters used by video encoder 20 from the received syntax elements and use the interpolation filters to produce predictive blocks.

Inverse quantization unit 86 inverse quantizes, i.e., de quantizes, the quantized transform coefficients provided in the bitstream and decoded by entropy decoding unit 80. The inverse quantization process may include use of a quantization parameter calculated by video encoder 20 for each video block in the video slice to determine a degree of quantization and, likewise, a degree of inverse quantization that should be applied. Inverse transform processing unit 88 applies an inverse transform, e.g., an inverse DCT, an inverse integer transform, or a conceptually similar inverse transform process, to the transform coefficients in order to produce residual blocks in the pixel domain.

After prediction processing unit 81 generates the predictive block for the current video block using, for example, intra or inter prediction, video decoder 30 forms a reconstructed video block by summing the residual blocks from inverse transform processing unit 88 with the corresponding predictive blocks generated by motion compensation unit 82. Summer 90 represents the component or components that perform this summation operation. Filter unit 92 filters the reconstructed video block using, for example, one or more of the ALF techniques, SAO techniques, deblocking techniques or other such filtering techniques.

Although not explicitly shown in FIG. 11, video decoder 30 may also include one or more of a deblocking filter, an SAO filter, or other types of filters. Other loop filters (either in the coding loop or after the coding loop) may also be used to smooth pixel transitions or otherwise improve the video quality. The decoded video blocks in a given frame or picture are then stored in DPB 94, which stores reference pictures used for subsequent motion compensation. DPB 94 may be part of or separate from additional memory that stores decoded video for later presentation on a display device, such as display device 32 of FIG. 1.

According to one example of this disclosure, video decoder 30 may determine parent motion for a block of video data and decode the block of video data according to the parent motion. To determine the parent motion, video decoder 30 may determine motion information for a parent block of the block. To determine the parent motion, video decoder 30 may receive the parent motion in an encoded bitstream, such as at a block level. To determine the parent motion, video decoder 30 may receive global parent motion information in one or more of an SPS, a PPS, a slice header, or a picture header. To determine the parent motion, video decoder 30 may use PMMVD to derive a motion vector for the parent block. To determine the parent motion, video decoder 30 may determine motion information for a temporal or spatial neighboring block of the parent block and use the motion information for the temporal or spatial neighboring block of the parent block as the motion information for the parent block of the block.

Video decoder 30 may receive a syntax element to indicate whether the parent motion is to be received in the encoded bitstream or is to be derived. Video decoder 30 may, for example, add the motion information for the parent block of the block to a merge mode candidate list or an AMVP mode candidate list for the block. Video decoder 30 may add the motion information for the parent block of the block to a PMMVD seed list for the block. In some examples, the parent block may be larger than the block.

Figure 13:
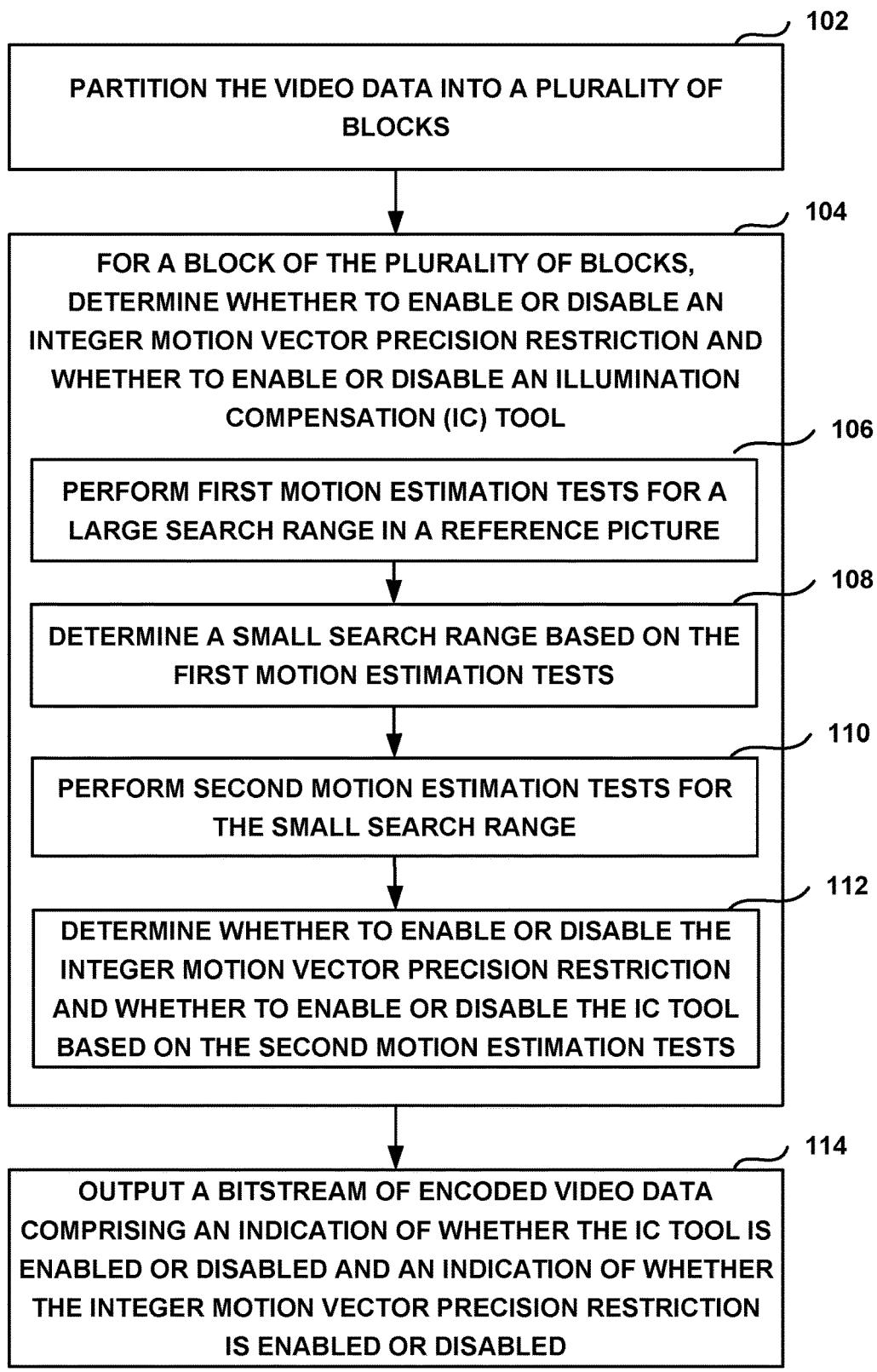
FIG. 13 is a flowchart illustrating an example operation of a device for encoding video data, in accordance with a technique of this disclosure.

FIG. 13 is a flowchart illustrating an example operation of a video encoder in accordance with a technique of this disclosure. The video encoder described with respect to FIG. 13 may, for example, be video encoder 20 described above or some other type of video encoder. In accordance with the techniques of FIG. 13, the video encoder partitions the video data into a plurality of blocks (102). For a block of the plurality of blocks, the video encoder determines whether to enable or disable an integer motion vector precision restriction and whether to enable or disable an IC tool (104). As part of determining whether to enable or disable the integer motion vector precision restriction and whether to enable or disable the IC tool, the video encoder performs first motion estimation tests for a large search range in a reference picture, (106). To perform the first motion estimation tests, the video encoder performs motion estimation tests only with the IC tool disabled and the integer motion vector precision restriction disabled and with the IC tool enabled and the integer motion vector precision restriction disabled. The video encoder determines a small search range that smaller than the large search range based on the first motion estimation tests (108). The video encoder performs second motion estimation tests for the small search range (110). The video encoder determines whether to enable or disable the integer motion vector precision restriction and whether to enable or disable the IC tool based on the second motion estimation tests (112). The video encoder outputs a bitstream of encoded video data comprising an indication of whether the IC tool is enabled or disabled and an indication of whether the integer motion vector precision restriction is enabled or disabled (114).

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of encoding video data, the method comprising:
    partitioning the video data into a plurality of blocks;
    for a block of the plurality of blocks, determining whether to enable or disable an integer motion vector precision restriction and whether to enable or disable an illumination compensation (IC) tool, wherein determining whether to enable or disable the integer motion vector precision restriction and whether to enable or disable the IC tool comprises:
        for a large search range in a reference picture, performing first motion estimation tests, wherein performing the first motion estimation tests comprises performing motion estimation tests only with the IC tool disabled and the integer motion vector precision restriction disabled and with the IC tool enabled and the integer motion vector precision restriction disabled;
        based on the first motion estimation tests, determining a small search range using a motion vector determined from motion estimation tests with the IC tool enabled and the integer motion vector precision restriction disabled, wherein the small search range is smaller than the large search range;
        for the small search range, performing second motion estimation tests only with the IC tool enabled and the integer motion vector precision restriction enabled;
        determining a second small search range using a motion vector determined from motion estimation tests with the IC tool disabled and the integer motion vector precision restriction disabled;
        performing third motion estimation tests by performing motion estimation tests only with the IC tool disabled and the integer motion vector precision restriction enabled; and
        based on the third motion estimation tests, determining whether to enable or disable the integer motion vector precision restriction and whether to enable or disable the IC tool; and
    outputting a bitstream of encoded video data comprising an indication of whether the IC tool is enabled or disabled and an indication of whether the integer motion vector precision restriction is enabled or disabled.

2. The method of claim 1, wherein determining the small search range comprises:
    based on the first motion estimation tests, determining a motion vector; and
    based on the motion vector, locating the small search range.

3. The method of claim 1, wherein performing the motion estimation tests with the integer motion vector precision restriction enabled only when the IC tool is disabled comprises only testing motion vectors with integer precision.

4. A device for encoding video data, the method comprising:
    a memory configured to store video data; and
    one or more processors configured to
        partition the video data into a plurality of blocks;
        for a block of the plurality of blocks, determine whether to enable or disable an integer motion vector precision restriction and whether to enable or disable an illumination compensation (IC) tool, wherein to determine whether to enable or disable the integer motion vector precision restriction and whether to enable or disable the IC tool, the one or more processors are configured to:
            for a large search range in a reference picture, perform first motion estimation tests, wherein to perform the first motion estimation tests the one or more processors are configured to perform motion estimation tests only with the IC tool disabled and the integer motion vector precision restriction disabled and with the IC tool enabled and the integer motion vector precision restriction disabled;
            based on the first motion estimation tests, determine a small search range using a motion vector determined from motion estimation tests with the IC tool enabled and the integer motion vector precision restriction disabled, wherein the small search range is smaller than the large search range;

for the small search range, perform second motion estimation tests only with the IC tool enabled and the integer motion vector precision restriction enabled;

determine a second small search range using a motion vector determined from motion estimation tests with the IC tool disabled and the integer motion vector precision restriction disabled;

perform third motion estimation tests by performing motion estimation tests only with the IC tool disabled and the integer motion vector precision restriction enabled; and based on the third motion estimation tests, determine whether to enable or disable the integer motion vector precision restriction and whether to enable or disable the IC tool; and output a bitstream of encoded video data comprising an indication of whether the IC tool is enabled or disabled and an indication of whether the integer motion vector precision restriction is enabled or disabled.

5. The device of claim 4, wherein to determine the small search range, the one or more processors are configured to:
based on the first motion estimation tests, determine a motion vector; and
based on the motion vector, locate the small search range.

6. The device of claim 4, wherein to perform the motion estimation tests with the integer motion vector precision restriction enabled only when the IC tool is disabled, the one or more processors are configured to only test motion vectors with integer precision.

7. A non-transitory computer readable medium storing instructions that when executed by one or more processors cause the one or more processors to:
partition the video data into a plurality of blocks;
for a block of the plurality of blocks, determine whether to enable or disable an integer motion vector precision restriction and whether to enable or disable an illumination compensation (IC) tool, wherein to determine whether to enable or disable the integer motion vector precision restriction and whether to enable or disable the IC tool, the instructions cause the one or more processors to:
for a large search range in a reference picture, perform first motion estimation tests, wherein to perform the first motion estimation tests the one or more processors are configured to perform motion estimation tests only with the IC tool disabled and the integer motion vector precision restriction disabled and with the IC tool enabled and the integer motion vector precision restriction disabled;
based on the first motion estimation tests, determine a small search range using a motion vector determined from motion estimation tests with the IC tool enabled and the integer motion vector precision restriction disabled, wherein the small search range is smaller than the large search range;
for the small search range, perform second motion estimation tests only with the IC tool enabled and the integer motion vector precision restriction enabled;
determine a second small search range using a motion vector determined from motion estimation tests with the IC tool disabled and the integer motion vector precision restriction disabled, and perform third motion estimation tests by performing motion estimation tests only with the IC tool disabled and the integer motion vector precision restriction enabled; and based on the third motion estimation tests, determine whether to enable or disable the integer motion vector precision restriction and whether to enable or disable the IC tool; and output a bitstream of encoded video data comprising an indication of whether the IC tool is enabled or disabled and an indication of whether the integer motion vector precision restriction is enabled or disabled.

8. The non-transitory computer readable medium of claim 7, wherein to determine the small search range, the instructions cause the one or more processors to:
based on the first motion estimation tests, determine a motion vector; and
based on the motion vector, locate the small search range.

9. The non-transitory computer readable medium of claim 7, wherein to perform the motion estimation tests with the integer motion vector precision restriction enabled only when the IC tool is disabled, the instructions cause the one or more processors to only test motion vectors with integer precision.

10. An apparatus for encoding video data, the apparatus comprising:
means for partitioning the video data into a plurality of blocks;
means for determining whether to enable or disable an integer motion vector precision restriction and whether to enable or disable an illumination compensation (IC) tool for a block of the plurality of blocks, wherein the means for determining whether to enable or disable the integer motion vector precision restriction and whether to enable or disable the IC tool comprises:
means for performing first motion estimation tests for a large search range in a reference picture, wherein the means for performing the first motion estimation tests comprises means for performing motion estimation tests only with the IC tool disabled and the integer motion vector precision restriction disabled and with the IC tool enabled and the integer motion vector precision restriction disabled;
means for determining a small search range, based on the first motion estimation tests using a motion vector determined from motion estimation tests with the IC tool enabled and the integer motion vector precision restriction disabled, wherein the small search range is smaller than the large search range;
means for performing second motion estimation tests for the small search range only with the IC tool enabled and the integer motion vector precision restriction enabled;
means for determining a second small search range using a motion vector determined from motion estimation tests with the IC tool disabled and the integer motion vector precision restriction disabled; and
means for performing third motion estimation tests by performing motion estimation tests only with the IC tool disabled and the integer motion vector precision restriction enabled; and
means for determining whether to enable or disable the integer motion vector precision restriction and whether to enable or disable the IC tool based on the motion estimation tests; and
means for outputting a bitstream of encoded video data comprising an indication of whether the IC tool is enabled or disabled and an indication of whether the integer motion vector precision restriction is enabled or disabled.

\* \* \* \* \*